July 21, 1970 W. C. SUSOR 3,521,039
COMPUTER VERIFICATION
Filed Feb. 26, 1968 5 Sheets-Sheet 4
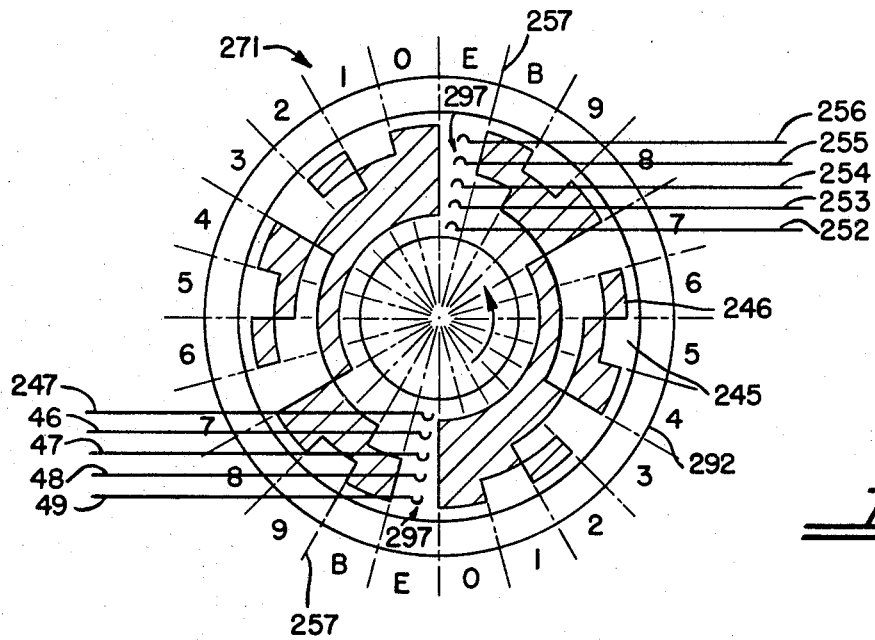
Fig_4
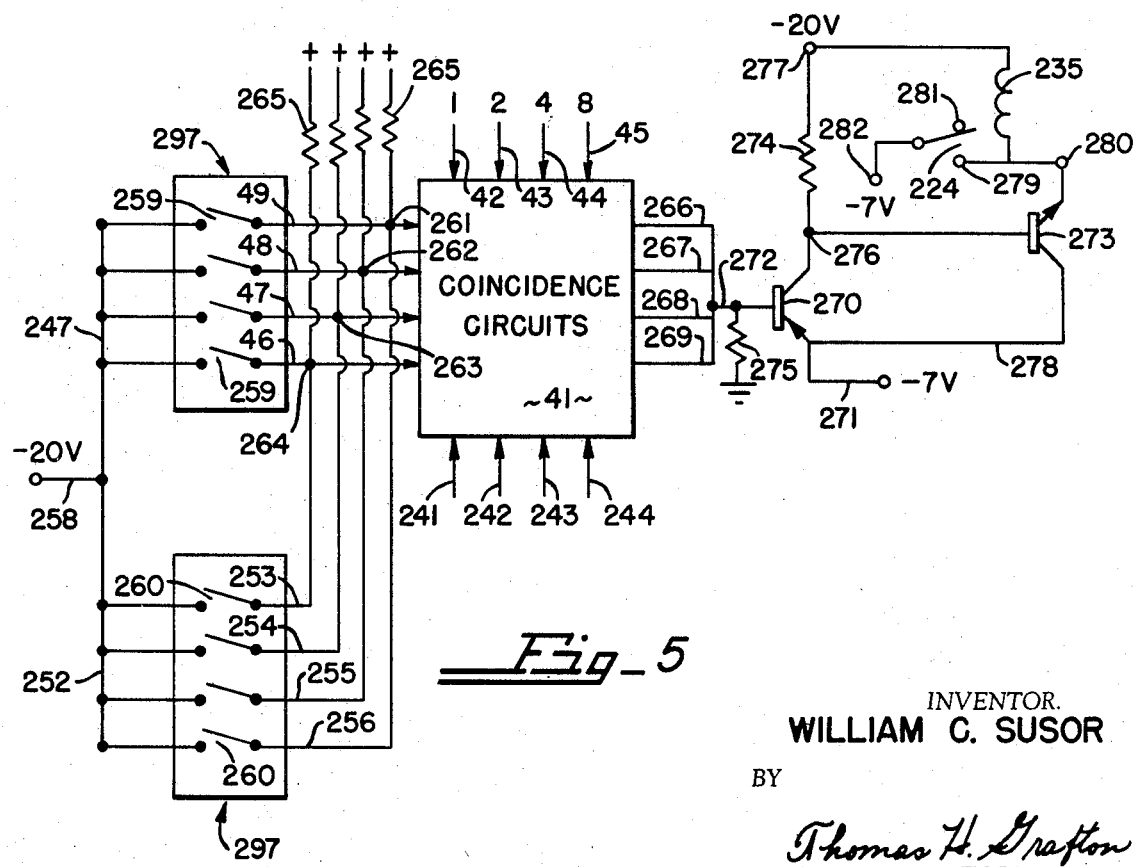
Fig_5
INVENTOR.
WILLIAM C. SUSOR
BY
Thomas H. Grafton
ATTORNEY July 21, 1970     W. C. SUSOR     3,521,039
COMPUTER VERIFICATION Filed Feb. 26, 1968     5 Sheets-Sheet 5

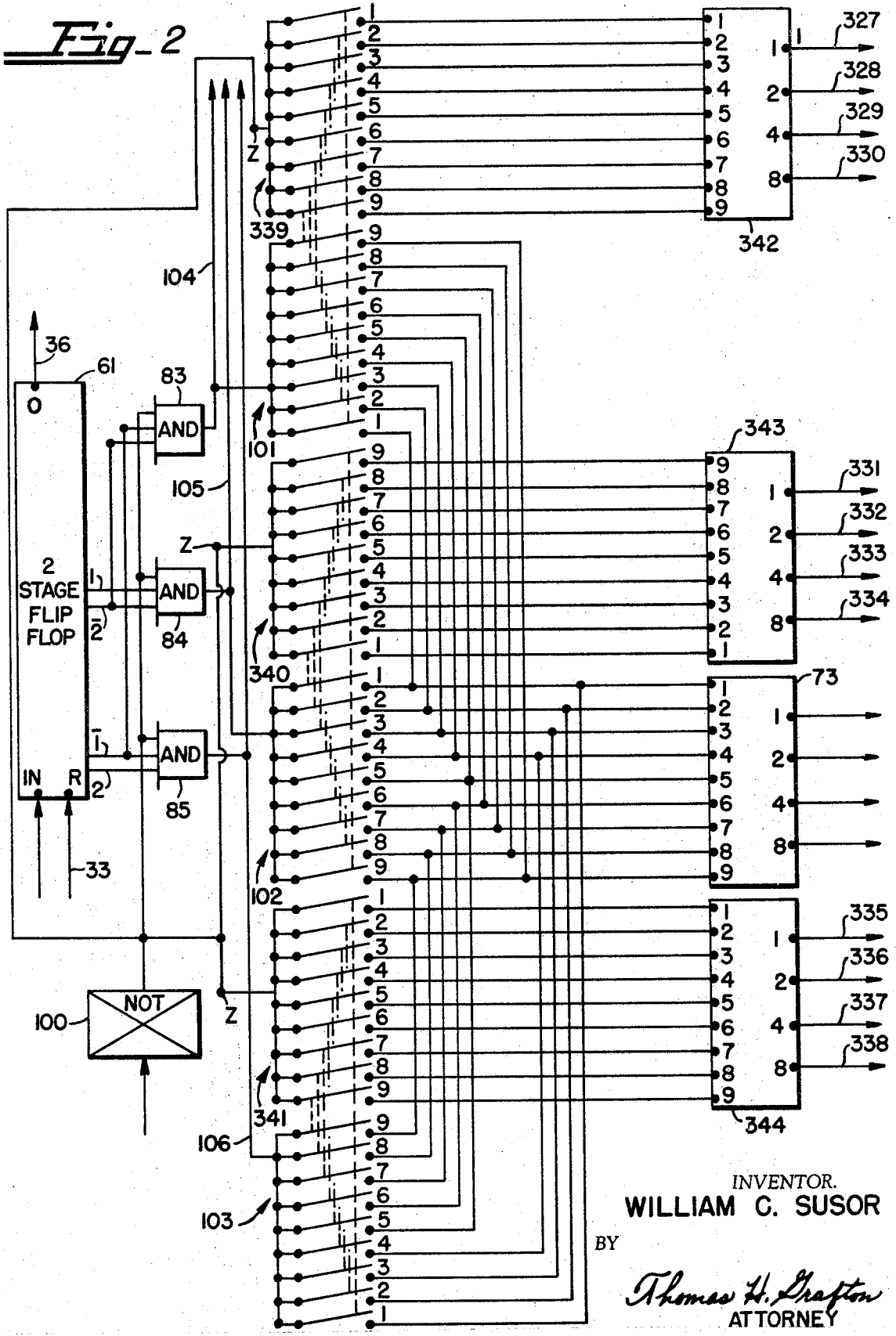

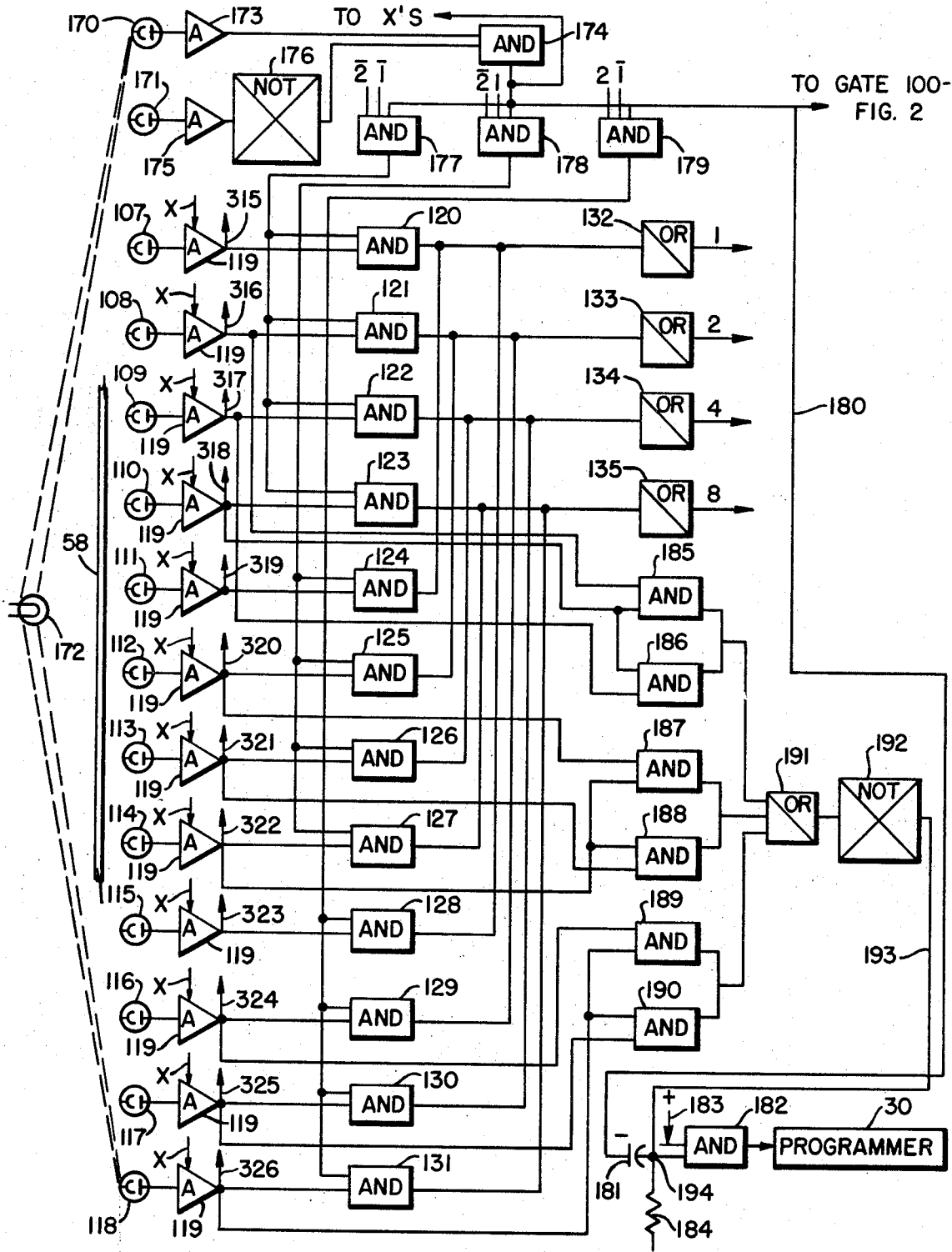

INVENTOR.
WILLIAM C. SUSOR
BY
*Thomas H. Grafton*
ATTORNEY

United States Patent Office …

3,521,039
Patented July 21, 1970

3,521,039
COMPUTER VERIFICATION
William C. Susor, Toledo, Ohio, assignor to The Reliance Electric and Engineering Company, Toledo, Ohio, a corporation of Ohio
Filed Feb. 26, 1968, Ser. No. 708,230
Int. Cl. G06f 15/20, 11/08
U.S. Cl. 235—151.33          8 Claims

ABSTRACT OF THE DISCLOSURE

An electronic computing weighing scale having a computer for computing the value of a commodity according to its weight factor and a selected price factor and readout means in circuit with the computer for indicating the selected price factor and the computed value, with check circuitry responsive to the setting of the price factor and in circuit with the readout means for verifying the computer.

BACKGROUND OF THE INVENTION

Field of the invention

The invention relates to electronic computing weighing scales of the retail type used in pre-packaging commodities in food stores. The scale's printer prints a ticket, label or the like bearing the computed value and selected unit price together with the net weight, date, store code, commodity name, and commodity grade which is attached to or placed in its respective package.

Description of the prior art

The computer disclosed in U.S. application Ser. No. 439,751 filed Mar. 15, 1965, now U.S. Pat. No. 3,453,422, issued July 1, 1969, in the name of William C. Susor is shown as a part of a system for weighing, computing and printing a record of the weight and computed value of each of a plurality of successively weighed loads. The computer verification check in the system is made by multiplying a price entry times one and seeing if the unit price printed on a label agrees with the price entry set up in the computer.

SUMMARY OF THE INVENTION

Specifically, the invention envisions a check or interlock circuit including coincidence circuit means for comparing an input responsive to the setting of price entry means of the computer with an input produced by the readout means which indicates the selected unit price, the selected unit price being entered through the computer into the readout means. The interlock circuit prevents completion of the computing scale's cycle when the selected price factor set up by the price entry means disagrees with the selected price factor indicated by the readout means indicating that an error has occurred.

One primary object is to provide computer verification.

Another object is to provide a check circuit for producing a check signal when the selected price factor set up by the price entry means of a computer agrees with the selected price factor indicated by readout means in circuit with the computer.

Still another object is to provide an interlock circuit for preventing completion of the cycle of operations of an automatic computing weighing scale when the selected price factor set up by the price entry means of the scale's computer disagrees with the selected price factor indicated by readout means in circuit with the computer.

BRIEF DESCRIPTION OF THE DRAWINGS

FIG. 2 is a circuit diagram of the price entry portion of the computer shown in FIG. 1;

FIG. 3 is a block diagram of a modified price entry portion for the computer shown in FIG. 1;

FIG. 4 is a diagram of brushes and a dual commutator used in the mechanical readout and printer shown in FIG. 1;

FIG. 5 is a schematic diagram of a circuit used in the mechanical readout and printer shown in FIG. 1.

DESCRIPTION OF THE PREFERRED EMBODIMENT

Figure 1:
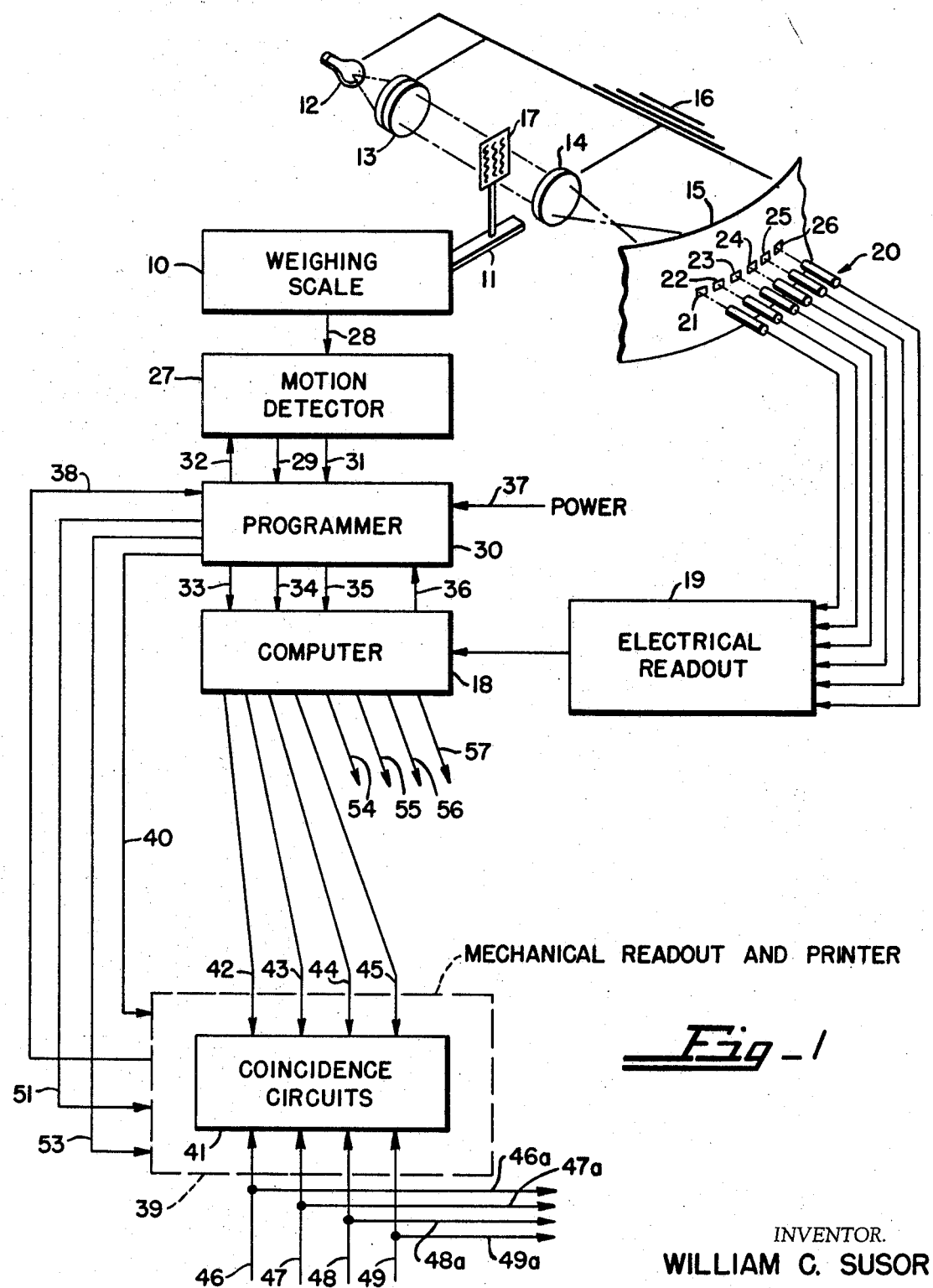
FIG. 1 is a schematic diagram illustrating the general organization of the weighing, computing and printing system.

Referring to FIG. 1, a computing weighing scale 10 includes a lever 11 and an optical projection system which diagrammatically includes a light source 12, a condensing lens 13, a projections lens 14 and a photocell mask 15. The light source 12, the lenses 13 and 14, and the mask 15 are connected to ground as shown at 16 (e.g., base of weighing scale), the mask 15 being rigidly mounted with respect to the projection optics. A coded chart 17 is moved by the load-responsive lever 11 in the optical projection system, the chart 17, hence, being condition responsive. The computer 18 disclosed in the above U.S. application Ser. No. 439,751 receives weight information from the scale and multiplies the weight of an article upon the scale by the unit price of such article to compute the value of such article. The computer 18 also multiplies such unit price times one so that it can produce a unit price output. The computer 18 has a weight input which is compatible with the parallel 1–2–4–8 binary coded decimal output of an electrical readout 19 in circuit therewith.

The chart 17 has a matrix of coded markings arranged in vertical bands so that the relative position thereof may be read by a bank of readout photocells 20, with one cell being associated with each column, providing an indication of the weight upon the scale. The output of the photocells is applied to the electrical readout 19, which makes available weight information to the input of the computer 18. The mask 15 is shown as being slitted at 21–26 so that a small and clearly defined portion of the projected image of the chart 17 is permitted to fall on each of the sensitive grids of the photocells, i.e., the mask screens out unwanted chart bits (the projection lens 14 projects all of the bits in its field of view). There is a total of fourteen photocells in the photocell bank 20, only six of the fourteen photocells being shown for the sake of simplicity. Fourteen photocells are enough to read out a chart capacity of 25.00 pounds.

The weighing scale 10 is connected operatively to a motion detector 27 through a connection 28 to prevent erroneous weight readouts from taking place when the weighing mechanism is in motion. The motion detector 27 applies no motion signals through a lead 29 to a programmer 30. The motion detector 27 also applies motion signals through a lead 31 to the programmer 30 and receives conditioning signals from the programmer 30 through a lead 32.

The programmer 30 which is disclosed in detail in U.S. application Ser. No. 429,230 filed Feb. 1, 1965 in the names of W. C. Susor and O. J. Martin applies reset signals and command to compute signals through leads 33, 34 and 35, respectively, to the computer 18 and receives program advance signals through a lead 36 from the computer 18. The programmer 30 also receives power on signals through a lead 37 and coincidence check signals through a lead 38. The coincidence check signals indicate that the computer 18 and the read out positions of the number wheels in a mechanical readout and printer 39 agree. The programmer 30 also applies a signal through a lead 40 to the mechanical readout and printer 39 commanding it to print.

The programmer 30 is used in conjunction with a mechanical readout which is disclosed in U.S. application Ser. No. 416,526, filed Dec. 7, 1964, in the name of C. E. Adler. The readout includes a combination of a series of modules each comprising a detent wheel which is directly gear connected to a commutator and to a print wheel. Each module indicates the digits of a particular denominational order. When the turning print wheel approaches the correct indicating position, a stopping latch intercepts the correct one of the teeth of the detent wheel to arrest the detent wheel. Such readout also includes coincidence circuits 41 which receive 1–2–4–8 binary coded unit price signals from the computer 18 through leads 42–45 and 1–2–4–8 binary coded decimal signals through leads 46–49 indicative of the positions of the commutators. The detent wheels and thus the print wheels are stopped when the coincidence circuits determine that the wheels are in the correct indicating positions. The readout also includes a solenoid which when it receives a signal through a lead 51 permits a new reading to be made and a solenoid which when it receives a signal through a lead 53 unlocks the unit price indicating modules which otherwise remain locked to accomplish repeat printing without recycling such unit price indicating modules. Similarly, the coincidence circuits 41 receive 1–2–4–8 binary coded decimal value signals from the computer 18 through leads 54–57 and 1–2–4–8 binary coded decimal signals through leads not shown indicative of the positions of the commutators.

Although the various logic circuits mentioned herein are in common use in the electronic control field, a brief description of the function of each circuit is as follows. An AND logic circuit produces an output signal when, and only when, all of a plurality of input signals are present. A NOT logic circuit produces an output signal at all times unless an input signal is present. A MEMORY logic circuit sometimes known as a flip flop or bistable circuit has "ON" and "OFF" or reset input terminals, and "ON" and "OFF" output terminals. The MEMORY or bistable circuit produces an "ON" output signal in response to a signal applied at the "ON" input terminal and continues to produce the "ON" output signal, even though the input signal at the "ON" input terminal is removed, until a signal is applied to the "OFF" input terminal. The MEMORY circuit will then be turned "OFF" and produce an "OFF" output signal even though the signal at the "OFF" input terminal is removed. The MEMORY circuit will revert to its initial state upon application of a signal to the "ON" input terminal. An OR logic circuit produces an output upon receiving an input signal at any of a plurality of input terminals. For further details on the construction and operation of various types of logic circuits reference is made to an article entitled "Static Switching Devices," by Robert A. Mathias, in Control Engineering, May 1957. All of the logic circuits mentioned hereinafter, such as gates and flip flops, and the clock and diode matrix circuits are of conventional type. The connections between said circuits are clearly shown in the drawings and will not be described in detail.

With reference to FIGS. 4–5, the 1–2–4–8 binary coded unit price signals from the computer 18 are applied through the leads 42–45 to the coincidence circuits 41. There are a set of leads 42–45 and a coincidence circuit 41 for each denominational order in the unit price. A computer having a maximum price input of $9.99 requires three sets of leads 42–45 and three coincidence circuits 41 and also three sets of the foregoing gear-connected detent wheels, commutators and print wheels. One of such commutators is shown in FIG. 4; the commutators and gear-connected detent wheels and print wheels, as well as the circuit shown in FIG. 5, are located in the mechanical readout and printer 39 shown in FIG. 1. The readout device functions to position each unit price print wheel according to its respective 1–2–4–8 binary coded unit price signal from the computer 18 or to B or E (twelve printing positions). Since each print wheel turns with its gear-connected detent wheel and commutator, an understanding of how the commutator 271 (FIG. 4) is stopped in readout position is an understanding of how the print wheel is stopped, the gear ratio being such that the print wheel turns twice for each turn of its detent wheel and commutator.

The following table (table No. 1) shows the positive or negative condition of the leads 42–45 according to the count:

TABLE NO. 1

| Count | Lead 42 | Lead 43 | Lead 44 | Lead 45 |
|---|---|---|---|---|
| 0 | − | − | − | − |
| 1 | + | − | − | − |
| 2 | − | + | − | − |
| 3 | + | + | − | − |
| 4 | − | − | + | − |
| 5 | + | − | + | − |
| 6 | − | + | + | − |
| 7 | + | + | + | − |
| 8 | − | − | − | + |
| 9 | + | − | − | + |

In addition, leads 241–244 are − − + + for blank (B), respectively, and are + + + + for extra (E), respectively.

The commutator 271 is provided with the pattern 292 having a conducting surface 245 and an insulated surface 246. The pattern has two identical portions, the right half of the pattern being a duplicate of the left half of the pattern. Hence, the commutator 271 needs only one-half a revolution or less to produce a readout. One set of stationary brushes 297 is connected to leads 247 and 46–49 and the other set is connected to leads 252–256, both sets being arranged to pick up the same 1–2–4–8 binary coded decimal signals as shown in table No. 1 above.

The commutator 271 turns counterclockwise as viewed in FIG. 4 and has segment lines 257, which divide the pattern into twenty-four equal segments, two for each number 0–9 to be indicated, two for a blank (B) to be indicated, and two extra ones (E). The two sets of brushes 297 are staggered relative to each other so that each tracks on different portions of the commutator 271.

The leads 247, 46–49 and 252–256 are shown connected to the coincidence circuits 41. Common commutator leads 247 and 252 are joined at the end of a lead 258 which is connected to a minus 20 volts power supply. Leads 46–49 are connected to the common lead 247 through contacts 259 and leads 253–256 are connected to the common lead 252 through contacts 260. Actually, contacts 259 and 260 do not exist but are shown only to illustrate how the commutator electrically connects and disconnects the respective leads. Leads 49 and 256 are joined at terminal 261; leads 48 and 255 are joined at terminal 262; leads 47 and 254 are joined at terminal 263; and leads 46 and 253 are joined at terminal 264. Resistors 265 are connected to such terminals 261–264 to provide positive inputs to the coincidence circuits 41 which correspond to the positive inputs provided by the computer leads 42–45.

The brushes of the common leads 247 and 252 always contact the conducting surface 245. The brushes of the rest of the leads contact the conducting surface 245 or the insulated surface 246 depending on the position of the commutator 271. When the brushes 297 are upon the insulated surface 246 (common brushes never on the insulated surface 246), the circuits from the common leads 247 and 252 are broken. This is shown as open contacts 259 and 260. When the brushes 297 (common brushes always on the conducting surface 245) are upon the conducting surface 245, the circuits from the common leads 247 and 252 are completed. This closes the respective contacts 259 and 260. Opening of contacts 259 in leads 46–49 applies positive inputs from the resistors 265 through the leads 46–49 to the coincidence circuits 41. Opening of contacts 260 in leads 253–256 also applies positive inputs from the resistors 265 through the leads 46–49 to the coincidence circuits 41, because leads 46–49 are joined to leads 256–253, respectively. Closing of contacts 259 in leads 46–49 applies negative inputs from the minus 20 volts power supply (lead 258) through the leads 46–49 to the coincidence circuits 41. Closing of contacts 260 in leads 253–256 applies negative inputs from the minus 20 volts power supply (lead 258) through the leads 46–49 to the coincidence circuits 41, because leads 46–49 are joined to leads 256–253, respectively.

The following table (table No. 2) shows the positive or negative condition of the leads 46–49 (positive or negative inputs to coincidence circuits) according to which of the commutator segments are at the brushes 297.

TABLE NO. 2

| Segments | Leads 49 | Leads 48 | Leads 47 | Leads 46 |
|---|---|---|---|---|
| 0 | + | + | + | + |
| 1 | − | + | + | + |
| 2 | + | − | + | + |
| 3 | − | − | + | + |
| 4 | + | + | − | + |
| 5 | − | + | − | + |
| 6 | + | − | − | + |
| 7 | − | − | − | + |
| 8 | + | + | + | − |
| 9 | − | + | + | − |
| B | + | + | − | − |
| E | − | − | − | − |

Table No. 1 (counts 0–9) and table No. 2 (segments 0–9) are alike, except the positive and negative input conditions are opposite. Also, the positive and negative input conditions in table No. 2 for B and E are like such conditions or leads 241–244. For the sake of simplicity, the following description ignores readout positions B and E, since an understanding of the readout device can be had by an understanding of how the print wheel is positioned according to the count in the computer, i.e., counts 0–9.

Any coincidence circuit which matches plus and minus inputs and produces current flow in output leads can be used. When the input on commutator lead 49 is plus and the input on computer lead 42 is minus or vice versa, current flow stops in output lead 266, when the input on commutator lead 48 is plus and the input on computer lead 43 is minus or vice versa, current flow stops in output lead 267, when the input on commutator lead 47 is plus and the input on computer lead 44 is minus or vice versa, current flow stops in output lead 268, and when the input on commutator lead 46 is plus and the input on computer lead 45 is minus or vice versa, current flow stops in output lead 269. Stoppage of current flow in all of the output leads 266–269 indicates coincidence. If there is current flow in any one of the output leads 266–269, coincidence does not exist. This means, for example, that if the count in the computer is three (+ + − − inputs, see table No. 1) coincidence occurs when the commutator segments 3 are at the brushes 297 (− − + + inputs, see table No. 2).

If there is current flow in output lead 266 or 267 or 268 or 269 (not at coincidence), then there is current flow in a PNP transistor 270 which has its emitter connected to a minus 7 volts power supply through a lead 271, its base connected to the leads 266–269 through a lead 272, and its collector connected to the base of an NPN transistor 273 and to a resistor 274. A resistor 275 is connected between the lead 272 and ground. When the PNP transistor 270 is on, terminal 276 connected to the collector of the transistor comes to minus 7 volts, the same as that of the power supply on the lead 271. The resistor 274 and a latch coil 235 are connected to a minus 20 volts power supply connected to a terminal 277, the latch coil 235 also being connected to the emitter of the NPN transistor 273, and the collector of the NPN transistor 273 is connected through a lead 278 to the emitter of the PNP transistor 270. A contact 224 when closed engages a terminal 279, connected to a terminal 280 between the coil 235 and the emitter of the transistor 273, and when open engages a dead terminal 281, the contact 224 being connected to a minus 7 volts power supply on a terminal 282. When the PNP transistor 270 is on, the NPN transistor 273 also is on because the base of the transistor 273 (connected to minus 7 volts terminal 276) is more positive than the emitter of the transistor 273 (connected to minus 20 volts terminal 277) and current flows through the coil 235.

In operation, to make a new reading the commutator 271 starts turning (as does its gear-connected detent wheel and print wheel). FIG. 4 shows the twelve printing positions of the print wheel as "0," "1," "2," etc., on the commutator 271. The latch coil 235 (FIG. 5) is energized at this time by the action of the readout device momentarily closing the contact 224. Closing of the contact 224 connects the minus 7 volts power supply at the terminal 282 to the latch coil 235, the coil 235 (only one shown in FIG. 5, but there is one for every readout module or subassembly) being kept energized by current flow through the transistors 270 and 273 due to no coincidence between the count in the computer and the position of the commutator 271.

The printing type on the print wheel correspond to the segments of the commutator 271, i.e., for example, when the "2" commutator segments are at the brushes 297, the "2" printing type is located in a printing station. Because of the dual commutator pattern, only one-half revolution or less of the commutator 271 is required for a readout, but, because of the 2:1 gear ratio, such one-half revolution of the commutator 271 produces a full revolution of the print wheel. Less than one-half revolution of the commutator can produce a readout depending on how soon the count in the computer and the commutator segments agree. As the print wheel which is to be positioned according to information in the computer approaches the readout position, the coincidence circuits 41 detect coincidence and all current flow stops in output leads 266–269 and thus in transistors 270 and 273 and in the latch coil 235. Deenergization of the latch coil 235 permits a spring in the readout device to move a stopping latch pawl into engagement with a tooth of the detent wheel stopping the detent wheel and thus the commutator 271 and the print wheel in readout position. The computed value print wheels at this point in the cycle are stopped but not in final readout positions because computed value computation has not yet taken place.

The computer disclosed in the above U.S. application Ser. No. 439,751 is modified to have the selected price factors entered into the computer either by the manually operated selector switches shown in the application and in FIG. 2 or by photosensitive means shown in U.S. application Ser. No. 535,760 filed Mar. 21, 1966 in the name of William C. Susor and in FIG. 3. The mode of operation is selected automatically by the type of commodity name printing plate inserted in the scale. There are two types of commodity name printing plates, one such as is used in the computer described in the above U.S. application Ser. No. 439,751 for printing the commodity name only (selected price set up by manually operated switches), and the other as shown in the above U.S. application 535,760 defining openings with readily removable masks covering selected openings in a pattern according to the selected price factor and being both for masking the photosensitive means from its light source to operate the photosensitive means according to the pattern and for printing the commodity name. Computing is prevented or interrupted if the light source fails or if an attempt is made to set up a place in the selected price factor in excess of a predetermined number or if a commodity name printing plate is not in operative position.

The computer 18 includes a price entry section (FIG. 2) having a two-stage flip flop 61 which counts to three by the following code:

| 1 | 2 | 4 | 8 | Count | Binary Output |
|---|---|---|---|-------|---------------|
| 0 | 0 | 0 | 0 | 0 | $\overline{1}\,\overline{2}$—not 1 not 2 |
| 1 | 0 | 0 | 0 | 1 | $1\,\overline{2}$—true 1 not 2 |
| 0 | 1 | 0 | 0 | 2 | $\overline{1}\,2$—not 1 true 2 |
| 1 | 1 | 0 | 0 | 3 | $1\,2$—true 1 true 2 |

The price entry section has a capacity of $9.99. The least significant place in the selected price per pound is multiplied by each place in the weight figure using the least significant place first, etc. The price entry circuit includes a bank of nine cents contacts 101, a bank of nine dimes contacts 102, and a bank of nine dollars contacts 103 which are closed by setting price knobs or levers to selected positions. The contacts are in circuit with the respective ones of terminals 1–9 in diode matrix 73. The AND gate 83 when enabled by an input from a NOT gate 100 and by the two-stage flip flop 61 being in its reset state applies an output to a lead 104 (controls partial product gating not shown) and to the bank of cents contacts 101; the AND gate 84 when enabled by an input from the NOT gate 100 and by the two-stage flip flop 61 being in its count one state applies an output to a lead 105 (controls partial product gating not shown) and to the bank of dimes contacts 102; and the AND gate 85 when enabled by an input from the NOT gate 100 and by the two-stage flip flop 61 being in its count two state applies an output to a lead 106 (controls partial product gating not shown) and to the bank of dollars contacts 103.

The decimal price entry, e.g., a price of $1.12, would connect a closed contact in the bank 101 to the "2" terminal of the diode matrix 73, a closed contact in the bank 102 to the "1" terminal of the diode matrix 73, and a closed contact in the bank 103 to the "1" terminal of the diode matrix 73. is changed to 1–2–4–8 binary coded decimal by the diode matrix 73. Only one bank of contacts is energized at a time as programmed by the two-stage flip flop 61. When price contacts are closed, output terminals "1," "2," "4" and "8" of the diode matrix 73 apply binary coded decimal inputs to the rest of the computer as shown in the above U.S. application Ser. No. 439,751. Zero places in the price entry are entered by opening all of the contacts in the respective contact banks 101–103.

The computer 18 which is disclosed in the above U.S. application Ser. No. 439,751 is modified to have the selected price factors entered into the computer either by the manually operated selector switches 101–103 in a first mode of operation or by photosensitive means in a second mode of operation. One change is shown in FIG. 2, i.e., the NOT gate 100 in circuit with the inputs of the AND gates 83–85 is an added element. The photosensitive means includes four cents photocells 107–110 (FIG. 3), four dimes photocells 111–114 and four dollars photocells 115–118. Amplifiers 119 apply the amplified photocell outputs to AND gates 120–131, respectively. The outputs of AND gates 120, 124, and 128 are applied to an OR gate 132; the outputs of AND gates 121, 125, and 129 are applied to an OR gate 133; the outputs of AND gates 122, 126 and 130 are applied to an OR gate 134; and the outputs of AND gates 123, 127 and 131 are applied to an OR gate 135. The outputs of the OR gates 132–135 are applied to the output terminals "1," "2," "4" and "8," respectively, of the diode matrix 73 (FIG. 2) for the application of binary coded decimal price entry inputs to the rest of the computer.

The commodity name printing plate 58 defines four cents holes, for dimes holes and four dollars holes. Photocells 107–118 look at the holes. The commodity plate 58 also defines an interlock hole. An interlock photocell 170 looks at the interlock hole and an interlock photocell 171 is located at a solid portion of the commodity plate 58.

The commodity name printing plate 58 except for the holes is like the printing plate disclosed in U.S. Pat. No. 3,334,583 issued Aug. 8, 1967 in the name of Clarence E. Adler and is secured in the printer disclosed in such patent in the same manner as the prior printing plate is secured in the printer, i.e., by means of two magnets. Both printing plates function to print the name of the commodity. A light source 172 illuminates the photocells 107–118 and 170 to activate them through those of the holes in the printing plate 58 which are uncovered (holes corresponding to photocells 107–118 uncovered in accordance with unit price).

The four cents holes correspond, respectively, to 1–2–4–8 binary coded decimal numbers in the cents place and photocells 107–110, accordingly, correspond, respectively, to the 1–2–4–8 binary coded decimal numbers in the cents place; the four dimes holes correspond, respectively, to 1–2–4–8 binary coded decimal numbers in the dimes place and photocells 111–114, accordingly, correspond, respectively, to the 1–2–4–8 binary coded decimal numbers in the dimes place; and the four dollars holes correspond, respectively, to 1–2–4–8 binary coded decimal numbers in the dollars place and photocells 115–118, accordingly, correspond, respectively, to the 1–2–4–8 binary coded decimal numbers in the dollars place.

The amplified output of the interlock photocell 170 is applied by an amplifier 173 to an AND gate 174 and the amplified output of the interlock photocell 171 is applied by an amplifier 175 to a NOT gate 176 having its output applied to an input of the AND gate 174. The positive output of the AND gate 174 is applied to inputs of AND gates 177–179, to the input of the NOT gate 100 (FIG. 2), through a lead 180 to a capacitor 181 connecting the lead to the input of an AND gate 182, and to the X inputs of the amplifiers 119 to enable such amplifiers.

The mode of operation is selected automatically by the type of commodity name printing plate inserted in the mechanical readout and printer 39. When the commodity name printing plate disclosed in the above U.S. Pat. No. 3,334,583 is in operative position in the printer (the plate is like plate 58 except it has no holes), the interlock photocells 170 and 171 are covered up by the plate preventing illumination of the photocells by the light source 172. Photocell 171 being dark partially enables the AND gate 174 because the signal is inverted by the NOT gate 176, but the partially enabled AND gate 174 is not completely enabled because the dark photocell 170 applies no input to the AND gate 174. Hence, the AND gate 174 is off and it applies no enabling signal to the AND gates 177–179. However, the signal is inverted by the NOT gate 100 (FIG. 2) which applies a positive enabling signal to the AND gates 83–85 and to terminals Z (FIG. 2) hereinafter described to automatically select the mode of operation wherein the price switches 101–103 are used to enter the selected price into the computer. As described in the above U.S. application Ser. No. 439,751, the AND gate 83 is enabled by the "$\overline{1}$" and "$\overline{2}$" outputs of the reset flip flop 61 (FIG. 2) to select the cents place in the price per pound to be multiplied first (price entry produces the 1–2–4–8 binary coded decimal output from the diode matrix 73). Then the AND gate 84 is enabled by the "$\overline{2}$" and "1" outputs of the flip flop 61 to select the dimes place in the price per pound to be multiplied next and then the AND gate 85 is enabled by the "2" and "$\overline{1}$" outputs of the flip flop 61 to select the dollars place in the price per pound to be multiplied next. Accordingly, when the commodity name printing plate disclosed in the above U.S. Pat. No. 3,334,583 is in operative position in the printer, price entry is accomplished as disclosed in such patent.

When commodity name printing plate 58 (FIG. 3) is in operative position in the printer, the interlock hole exposes the interlock photocell 170 to light from the light source 172 and the plate masks the interlock photocell 171 from such light. Photocell 171 being dark partially enables the AND gate 174 as described above and photocell 170 being light completely enables the AND gate 174. The AND gate 174 being on applies an enabling signal to the AND gates 177–179 and to the amplifiers 119 which enabling signal is not applied to the AND gates 83–85 because of the NOT gate 100. The AND gates 177–179 are completely enabled by the same respective outputs from the flip flop 61 as are the AND gates 83–85 as indicated at the input leads to the AND gates 177–179 in FIG. 3 to select the places in the price per pound to be multiplied one at a time (partial products). Enabled cents AND gate 177 enables cents AND gates 120–122 (partially enabled by 1–2–4–8 binary coded decimal signals from the photocells 107–110) which apply inputs to the OR gates 132–135 that have their outputs connected to the "1," "2," "4" and "8" output terminals of the diode matrix 73 (FIG. 2) to enter the cents place in the price entry into the computer by photosensitive means controlled by the printing plate 58. This eliminates the chance of operator's mistakes in entering the price through the switches 101–103. Once the supervisor has set up the correct price on the printing plate 58 by clipping on masks over the holes, the action of the operator in putting a "hamburg" printing plate in the printer, for example, sets up the correct "hamburg" price per pound in the computer. Enabled dimes AND gate 178 enables dimes AND gates 124–127 (partially enabled by 1–2–4–8 binary coded decimal signals from the photocells 111–114) which apply inputs to the OR gates 132–135 to enter the dimes place in the price entry into the computer by the photosensitive means. Enabled dollars AND gate 179 enables dollars AND gates 128–131 (partially enabled by 1–2–4–8 binary coded decimal signals from the photocells 115–118) which apply inputs to the OR gates 132–135 to enter the dollars place in the price entry into the computer by the photosensitive means.

The mode of operation also is selected automatically by whether or not a commodity name printing plate is in operative position in the printer (safety interlock). In the absence of a printing plate, both of the interlock photocells 170 and 171 are exposed to light from the source 172. Photocell 170 being light partially enables the AND gate 174, but the AND gate 174 is not completely enabled because the signal from the illuminated photocell 171 is inverted by the NOT gate 176. Accordingly, the AND gate 174 is off. As described above, when the AND gate 174 is off, the NOT gate 100 applies an enabling signal to the AND gates 83–85 to automatically select the mode of operation wherein the price switches 101–103 are used to enter the selected price into the computer.

The output of the AND gate 182 is connected to the input of the AND gate shown in the above U.S. application Ser. No. 429,230 (AND gate 67 in the application), which has its output connected to the "IN" terminal of the two-stage flip flop 54 shown in the application, throught the switches 69, 68, 71 and 208 shown in the application (AND gate 67, flip flop 54, switches 69, 68, 71 and 207 are part of the programmer 30, FIGS. 1 and 3). As described in such U.S. application Ser. No. 429,230, an interruption of the signal applied through the switches 68 and 69 shown in the application to the AND gate 67 shown in the application prevents advance of the programmer 30 or interrupts the program by resetting the programmer 30. Similarly, since the output of the AND gate 182 (FIG. 3) is applied as an input to the programmer 30 through the above existing circuitry, the turning off of the AND gate 182 prevents advance of the programmer 30 or interrupts the program by resetting the programmer 30.

In addition to the features of entering the selected price factor by novel photosensitive means, automatic selection of the mode of operation by whether or not a printing plate is in the printer and by which type of printing plate is in the printer, and control of the photosensitive means by a plate which also prints the commodity name as described above, there is an aditional feature of preventing or interrupting computing if the light source 172 fails. Failure of the light source 172 when the plate 58 is in the printer causes the interlock photocell 170 to go dark. As described above, when both of the interlock photocells 170 and 171 are not illuminated, the AND gate 174 is off. This puts the system automatically into the mode wherein the price switches 101–103 are used to enter price as described above and also produces a change in the sign of the signal applied through the lead 180 to the capacitor 181 from plus to minus. The mometary change from plus to minus causes the capacitor 181 to turn the AND gate 182 off momentarily. Thereafter, the minus signal applied by the lead 180 to the capacitor 181 does not affect the AND gate 182, i.e., only the momentary change from plus to minus affects the AND gate 182. Positive signals applied through a lead 183 and a resistor 184 then re-enable the AND gate 182. However, the momentary turning off of the AND gate 182 prevents advance of the programmer 30 or interrupts the program of the programmer 30 as described above, i.e. the interlock prevents or interrupts computing if the light source 172 fails.

The capacity of the computer 18 to accept a price entry is $9.99 which is the capacity of the switches 101–103 (FIG. 2). However, a malfunction in the photosensitive means or in its printing plate control for entering price might result in an attempt to enter a place in the selected price factor in excess of nine. As a protection against such an excess price enery, AND gates 185–190, OR gate 191, and NOT gate 192 are provided. The AND gate 185 receives the 2–8 binary coded decimal outputs (decimal 10) from the cents photocells 108 and 110 and the AND gate 186 also receives such 8 output from the photocell 110 and receives the 4 binary coded decimal output (decimal 12) from the cents photocell 109. Accordingly, any attempt to enter a number ten or larger in the cents place results in enabling AND gate 185 or 186. Similarly, AND gates 187 and 188 receive 2–8 and 8–4 binary coded decimal outputs from the respective dimes photocells and AND gates 189 and 190 receive 2–8 and 8–4 binary coded decical outputs from the respective dollars photocells. Accordingly, any attempt to enter a number ten or larger in the dimes or dollars place results in enabling the respective AND gates 187–190. The enabling of any one of the AND gates 185–190 results in an input signal to the OR gate 191 whose plus output signal is inverted to a minus signal by the NOT gate 192 and applied through a lead 193 to a point 194 in the circuit between the capacitor 181 and the AND gate 182. As long as point 194 is held negative, the AND gate 182 is closed. As described above, when the AND gate 182 is closed, advance of the programmer 30 is prevented or the program of the programmer 30 is interrupted, i.e., the interlock prevents or interrupts computing if the photosensitive means attempts to set up a place in the selected price factor in excess of a predetermined number.

The computer verification check in the system shown with the computer disclosed in the above U.S. application Ser. No. 439,751 is made by multiplying a price entry times one and seeing if the unit price printed on a label agrees with the price entry set up in the computer. In accordance with the invention, a check or interlock circuit including cents, dimes and dollars coincidence circuits 300, 301, and 302 (FIG. 6) compares an input responsive to either the price enry means shown in FIG. 2 or the price entry means shown in FIG. 3 with an input produced by the readout means which indicates unit price, the selected unit price being entered through the computer into the readout means. The interlock circuit of the invention prevents completion of the computing scale's cycle when the selected price factor set up by the price entry means disagrees with the selected price factor indicated by the readout means indicating that an error has occurred.

Figure 6:
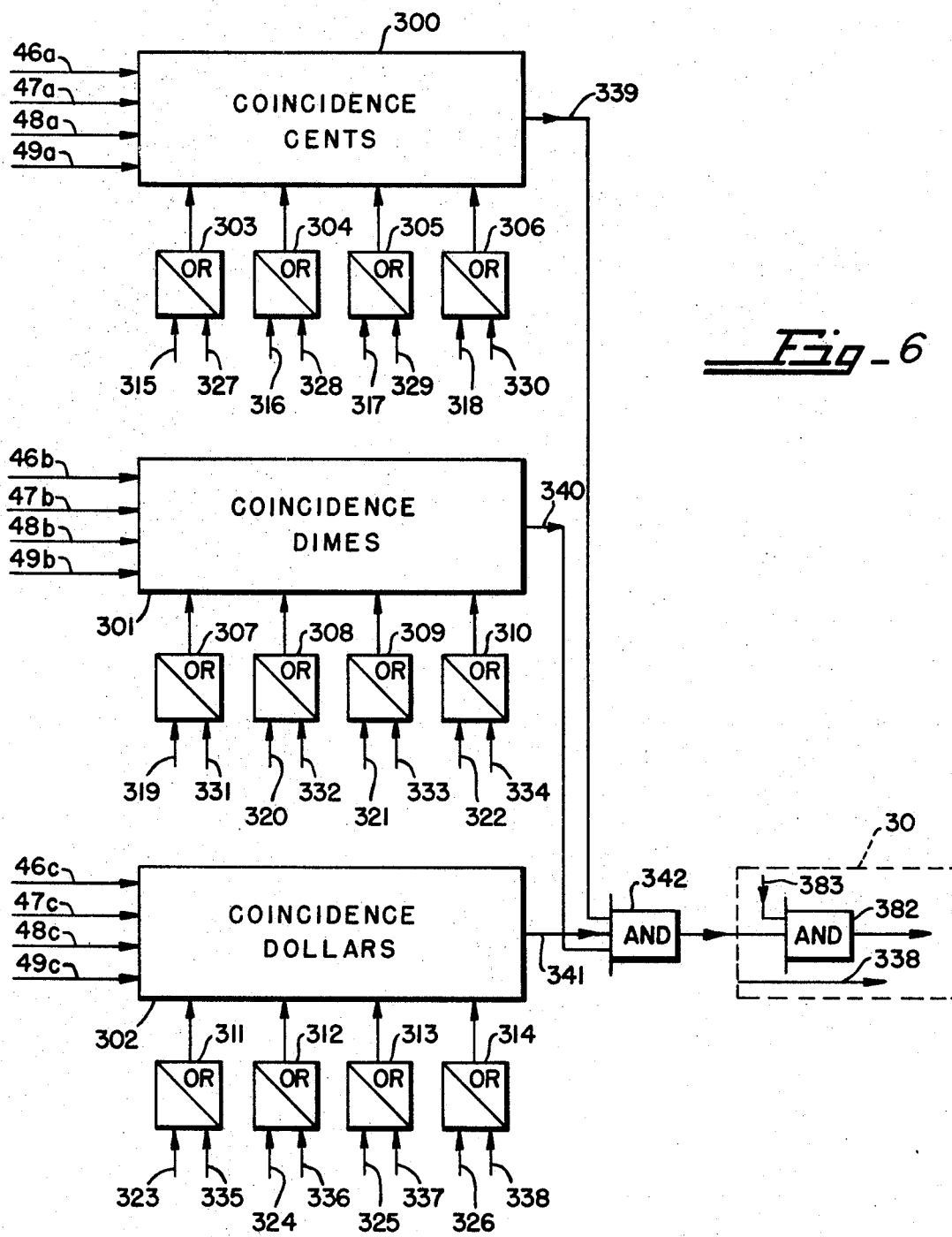
FIG. 6 is a block diagram of a check or interlock circuit which compares an input responsive to either the setting of the price entry means shown in FIG. 2 or the setting of the modified price entry means shown in FIG. 3 with an input produced by the mechanical readout and printer shown in FIG. 1 for the purpose of computer verification.

As described above, the positions of the unit price readout commutators (one commutator shown in FIG. 4) are indicated by signals on leads 46–49 (set of leads 46–49 for each place in the selected unit price). Leads 46a–49a are connected to the leads 46–49 (FIG. 1) and to the CENTS coincidence circuit 300 (FIG. 6); leads 46b–49b are connected to the DIMES coincidence circuit 301 (FIG. 6); and leads 46c–49c are connected to the DOLLARS coincidence circuit 302 (FIG. 6). As shown in FIG. 5, closed commutator contacts 259 place negative signals on leads 46–49 and open commutator contacts 259 place positive signals on leads 46–49. Negative and positive signals which are indicative of the selected price factor indicated by the readout means are placed on leads 46a–49a, 46b–49b and 46c–49c shown in FIG. 6.

Inputs from the computer price entry means are applied to the coincidence circuits 300–302 through OR gates 303–314.

The photosensitive price entry means shown in FIG. 3 is connected to the OR gates 303–314 (FIG. 6) through leads 315–326; cents place leads 315–318 are connected to OR gates 303–306, respectively; dimes place leads 319–322 are connected to OR gates 307–310, respectively; and dollars place leads 323–326 are connected to OR gates 311–314, respectively. When the photocells 107–118 see light and their respective amplifiers 119 are enabled by the system being in the photosensitive price entry mode, positive inputs are placed on the leads 315–326 to be compared by the coincidence circuits 300–302 to the negative inputs applied to the leads 46a–49a, 46b–49b and 46c–49c due to commutator contact closures. As described in connection with the coincidence circuits 41 (FIG. 1), any coincidence circuit which matches plus and minus inputs and produces current flow in output leads can be used.

The mechanical price entry means shown in FIG. 2 is connected to the OR gates 303–314 (FIG. 6) through leads 327–338; cents place leads 327–330 are connected to OR gates 303–306, respectively; dimes place leads 331–334 are connected to OR gates 307–310, respectively; and dollars place leads 335–338 are connected to OR gates 311–314, respectively. The bank of cents contacts 101 (FIG. 2) is connected to a slave deck of check contacts 339; the bank of dimes contacts 102 is connected to a slave deck of check contacts 340; and the bank of dollars contacts 103 is connected to a slave deck of check contacts 341. For example, a price of $1.12 would close the "2" contacts in both the cents contacts 101 and the check contacts 339, close the "1" contacts in both the dimes contacts 102 and the check contacts 340, and close the "1" contacts in both the dollar contacts 103 and the check contacts 341. The contacts 101–103 are connected to the terminals of the diode matrix 73 which changes the decimal price entry to 1–2–4–8 binary coded decimal entry to the computer 18 as described above. The contacts 339, 340 and 341 are connected to the terminals of similar diode matrixes 342, 343 and 344, respectively. The decimal price checking entry is changed by the diode matrixes 342–344 to 1–2–4–8 binary coded decimal entry for the respective OR gates 303–314 (FIG. 6). Each of the banks of slave deck check contacts 339–341 is enabled by the positive signal applied by the NOT gate 100 to terminals Z connected to the contacts 339–341 so that the closed check contacts produce positive outputs from the diode matrices 342–344. The coincidence circuits 300–302 match the positive inputs to the OR gate 303–314 with the negative inputs applied to the leads 46a–49a, 46b–49b and 46c–49c due to commutator contact closures.

In manual mode, the AND gate 174 (FIG. 3) has a negative output disabling the amplifiers 119 (FIG. 3) and enabling the slave deck contacts 339–341 to produce the proper input for the OR gates 303–314 (FIG. 6). In photosensitive mode, the AND gate 174 (FIG. 3) has a positive output enabling the amplifiers 119 (FIG. 3) and disabling the slave deck contacts 339–341 to produce the proper input for the OR gates 303–314 (FIG. 6).

In operation as explained above, either signals due to the setting of the mechanical price entry means shown in FIG. 2 or signals due to the setting of the photosensitive price entry means shown in FIG. 3 are applied to the OR gates 303–314 (FIG. 6). These same price entry signals are applied by the diode matrix 73 to the computer 18 which multiplies the price entry times one and enters the product into the mechanical readout 39 (FIG. 1) through leads 42–45. When signals on the leads 46–49 indicate that the mechanical positions of the commutators (one shown in FIG. 4) agree with the product in electrical form from the computer the commutators and their gear-connected print wheels are stopped in readout positions.

In order for the commutators to have stopped in correct readout positions the computer must have been able to multiply unit price times one correctly, i.e., there are no malfunctioning parts in the computer. For example, if the unit price entry was $1.12 and the computer is working right, $1.12 will be indicated by the mechanical readout and printer 39. As a check, signals indicative of the mechanical positions of the readout wheels are applied to the leads 46a–49a, 46b–49b and 46c–49c. The coincidence circuits 300–302 compare the inputs responsive to the setting of the particular price entry means being used at the time with the input produced by the readout means. Current flow stops in output leads 339–341 (FIG. 6) at coincidence found in circuits 300–302, respectively, in the same manner as current flow stops at coincidence in leads 266–269 as explained above in connection with FIG. 5. AND gate 342 produces an output when current flow stops at coincidence in leads 339–341 in circuit with such gate 342. The output of the AND gate 342 at coincidence is a check signal (no output from coincidence circuits 300–302, i.e., current flow stops also are check signals) indicating that the selected price factor set up by the price entry means agrees with the selected price factor indicated by the readout means. The coincidence circuits 300–302 and their adjuncts are means responsive to the setting of the price entry means and in circuit with the readout means for producing a check signal when the selected price factor set up by the price entry means agrees with the selected price factor indicated by the readout means, i.e., the interlock means is responsive to accurate operation of the computer for generating a check signal.

The AND gate 342 (FIG. 6) is in circuit with the programmer 30. The programmer 30 which is disclosed in the above application Ser. No. 429,230 includes an AND gate 382 (gate 82 in the pending application). In order for the computing, weighing and printing cycle to automatically complete itself, it is among other things necessary for the AND gate 382 to have an output. The AND gate 382 has an output when the check signal from the AND gate 342 enables it, the AND gate 382 being partially enabled by an input on a lead 383 (lead connected to AND gate 58 in the pending application) having nothing to do with an understanding of the invention. The check signal from the AND gate 342 takes the place of the signal on the lead 38 shown in FIG. 2 of the pending application as being connected to the AND gate 82 shown in the application. Lead 338 shown in FIG. 6 takes the place of the lead 38 shown in the pending application and is shown in FIG. 6 as having nothing to do with AND gate 382. Lead 338 carries a coincidence check signal indicating that the computed value (weight times price) set up by the computer 18 and the mechanical positions of the computed value readout wheels agree to another part of the programmer 30 in exactly the same manner as lead 38 shown in the pending application carries such signal to such other part of the programmer 30 and has nothing to do with an understanding of the invention.

The coincidence circuits 300–302 and their adjuncts are means responsive to the setting of the price entry means (see OR gates 303–314) and in circuit with the readout means (leads 46a–49a, 46b–49b and 46c–49c) for preventing completion (no output from AND gate 382 prevents completion) of the weighing scale cycle when the selected price factor set up by the price entry means disagrees with the selected price factor indicated by the readout means.

It is to be understood that the above description is illustrative of this invention and that various modifications thereof can be utilized without departing from its spirit and scope.

Having described the invention, I claim:

1. A computing weighing scale having a cycle of operations comprising, in combination, a computer for computing the value of a commodity according to its weight factor and a selected price factor, means for setting up the weight factor in the computer, price entry means for setting up the selected price factor in the computer, readout means in circuit with the computer for indicating the selected price factor and the computed value, the selected price factor being entered through the computer into the readout means, and interlock means responsive to the setting of the price entry means and in circuit with the readout means for preventing completion of said cycle when the selected price factor set up by the price entry means disagrees with the selected price factor indicated by the readout means.

2. A computing weighing scale having a cycle of operations comprising, in combination, a computer for computing the value of a commodity according to its weight factor and a selected price factor, means for setting up the weight factor in the computer, price entry means for setting up the selected price factor in the computer, readout means in circuit with the computer for indicating the selected price factor and the computed value, the selected price factor being entered through the computer into the readout means, and means responsive to the setting of the price entry means and in circuit with the readout means for producing a check signal when the selected price factor set up by the price entry means agrees with the selected price factor indicated by the readout means.

3. In a weighing scale system, in combination, computing means for computing computed value information in accordance with the weight and unit price of a load being weighed, a member having a plurality of readout positions, means responsive to coincidence of computed value information and the position of the member for stopping the member in readout position, and interlock means responsive to accurate operation of the computing means for generating a check signal.

4. A weighing scale according to claim 3 wherein manually operable switches enter the unit price into the computing means and the interlock means includes coincidence circuit means for receiving an input responsive to the setting of said switches.

5. A weighing scale according to claim 3 wherein photosensitive means enter the unit price into the computing means and the interlock means includes coincidence circuit means for receiving an input controlled by said photosensitive means.

6. In a weighing scale system, in combination, computing means for computing the value of a commodity according to its weight factor and a selected price factor, a member having a plurality of readout positions, means responsive to coincidence of one numerical place in the selected price factor and the position of the member for stopping the member in readout position, and interlock means responsive to coincidence between said numerical place in the selected price factor and the readout position of the member for generating a check signal.

7. A weighing scale according to claim 6 wherein manually operable switches enter the selected price factor into the computing means and the interlock means includes a coincidence circuit for comparing an input responsive to the setting of said switches with an input produced by said readout member.

8. A weighing scale according to claim 6 wherein photosensitive means enter the selected price factor into the computing means and the interlock means includes a coincidence circuit for comparing an input controlled by said photosensitive means with an input produced by said readout member.

References Cited

UNITED STATES PATENTS 3,015,088    12/1961    Bower _____ 340—146.1 X

MALCOLM A. MORRISON, Primary Examiner

U.S. Cl. X.R.

177—25; 235—153